(12) United States Patent
Davies (10) Patent No.: US 9,644,755 B2
(45) Date of Patent: May 9, 2017

(54) MOTORIZED SLEEVE VALVE (71) Applicant: Norgren Limited, Lichfield (GB)

(72) Inventor: Hywel Ward Davies, Burntwood (GB)

(73) Assignee: Norgren Limited, Lichfield (GB)

( * ) Notice: Subject to any disclaimer, the term of this patent is extended or adjusted under 35 U.S.C. 154(b) by 0 days.

(21) Appl. No.: 14/438,985

(22) PCT Filed: Nov. 7, 2013

(86) PCT No.: PCT/GB2013/052919
§ 371 (c)(1),
(2) Date: Apr. 28, 2015

(87) PCT Pub. No.: WO2014/072715
PCT Pub. Date: May 15, 2014

(65) Prior Publication Data
US 2015/0276075 A1    Oct. 1, 2015

(30) Foreign Application Priority Data

Nov. 7, 2012  (GB) .................................... 1220053.1

(51) Int. Cl.
  *F16K 31/04*   (2006.01)
  *F16K 15/18*   (2006.01)
  *F16K 1/12*    (2006.01)
  *B23P 15/00*   (2006.01)

(52) U.S. Cl.
  CPC ............ *F16K 15/18* (2013.01); *B23P 15/002* (2013.01); *F16K 1/12* (2013.01); *F16K 1/123* (2013.01); *F16K 31/04* (2013.01); *F16K 31/043* (2013.01); *Y10T 29/49416* (2015.01); *Y10T 137/0491* (2015.04)

(58) Field of Classification Search
  CPC ... F16K 3/24; F16K 3/246; F16K 3/26; F16K 3/265; F16K 15/18; F16K 31/043; F16K 31/04; F16K 1/12; F16K 1/123; B23P 15/002; Y10T 137/0491
  USPC .......................... 251/129.11, 129.12, 129.13
  See application file for complete search history.

(56) References Cited

U.S. PATENT DOCUMENTS

| | | | |
|---|---|---|---|
| 922,060 A * | 5/1909 | Stockdon | F16K 3/26 122/DIG. 15 |
| 4,279,266 A * | 7/1981 | Knox | B63B 13/02 114/333 |
| 4,339,109 A | 7/1982 | Kawata et al. | |

(Continued)

FOREIGN PATENT DOCUMENTS

| DE | 4213809 C1 | 7/1993 |
|---|---|---|
| EP | 0257906 A1 | 3/1988 |
| EP | 1526312 A1 | 4/2005 |

*Primary Examiner* — William McCalister
*Assistant Examiner* — Ian Paquette
(74) *Attorney, Agent, or Firm* — The Ollila Law Group LLC (57) ABSTRACT

A motorized sleeve valve (200) is provided. The motorized sleeve valve (200) includes a valve body (201) defining a first fluid port (207) and a second fluid port (208) and a valve sleeve (202) surrounding at least a portion of the valve body (201) and configured to move between a first position and at least a second position to selectively allow fluid to flow through the second fluid port (208). The motorized sleeve valve (200) further includes an electric motor (205) configured to actuate the valve sleeve (202) between the first position and the second position.

10 Claims, 5 Drawing Sheets

(56) References Cited

U.S. PATENT DOCUMENTS

| | | | | |
|---|---|---|---|---|
| 4,789,132 A * | 12/1988 | Fujita | ............ | F16K 1/12 |
| | | | | 137/219 |
| 6,929,241 B2 * | 8/2005 | Holloway, Jr. | ......... | E02B 13/00 |
| | | | | 137/625.38 |
| 2007/0284002 A1 * | 12/2007 | Hartman | ............ | F16K 1/123 |
| | | | | 137/219 |
| 2016/0061498 A1 * | 3/2016 | Larsen | ............ | F16K 37/0058 |
| | | | | 62/498 |

* cited by examiner

MOTORIZED SLEEVE VALVE

CROSS-REFERENCE TO RELATED APPLICATIONS

This is a National Stage entry of International Application No. PCT/GB2013/052919, with an international filing date of Nov. 7, 2013, which claims priority of Great Britain patent application no. 1220053.1, filed Nov. 7, 2012 and both entitled "MOTORIZED SLEEVE VALVE".

TECHNICAL FIELD

The embodiments described below relate to, valves, and more particularly, to a motorized sleeve valve.

BACKGROUND OF THE INVENTION

Fluid control valves are used in a wide variety of applications to control the flow and/or pressure of a fluid. The fluid may comprise a liquid, a gas, or a combination thereof. The fluid may include suspended particulates. While fluid control valves vary widely in the specific configuration used to open and close a fluid communication path through the valve, one specific type of fluid control valve is a poppet valve. Poppet valves generally include one or more valve orifices and a poppet member that moves to contact and seal the valve orifice(s) in order to perform a valve function. Poppet valves can be actuated in a variety of different manners. For example, some poppet valves are actuated using a solenoid. Alternatively, the poppet valve can be actuated by a pilot fluid source. In solenoid-actuated poppet valves, the solenoid comprises an electric current that passes through a coil, with the coil typically formed around a magnetic core. The energized solenoid generates a magnetic field. The magnetic field operates on a movable armature connected to the poppet member. Typically, the poppet valve also includes a spring or other biasing member that generates a biasing force in opposition to the magnetic field. Therefore, in the absence of a magnetic field generated by the solenoid, the poppet member is moved into a normally open or a normally closed position.

Poppet valves have several advantages. Poppet valves can accommodate high flow rates. Poppet valves can accommodate varying flow rates. Poppet valves can form a highly reliable seal, even in the presence of moisture, dirt, debris, etc. Due to the benefits that poppet valves provide, they are very popular for industrial applications.

Figure 1:
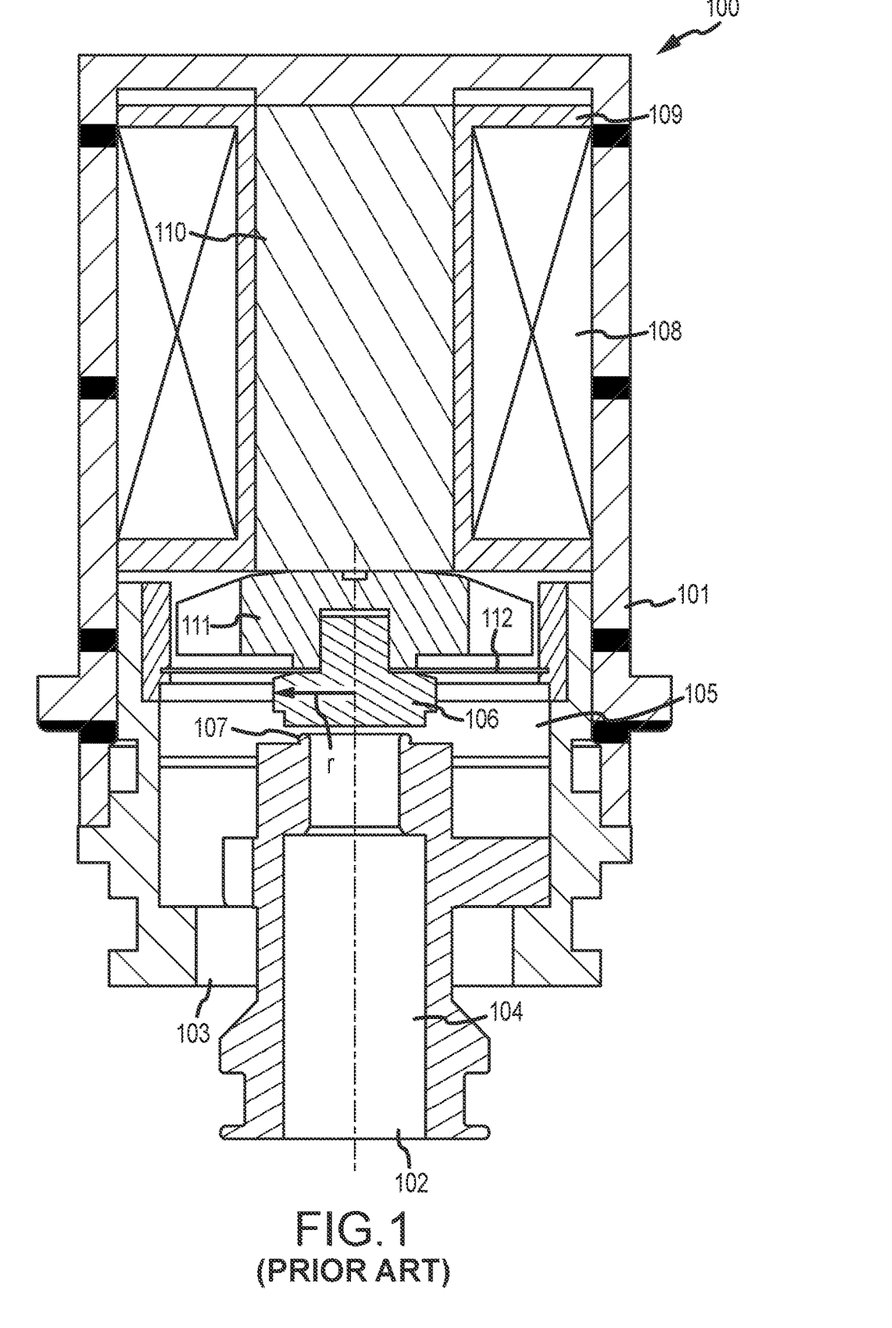
FIG. 1 shows a prior art solenoid actuated poppet valve.

FIG. 1 shows a prior art solenoid actuated poppet valve 100. The poppet valve 100 includes a housing 101, a fluid inlet 102, a fluid outlet 103, a fluid chamber 104, a valve seat 107, and a poppet member 106. The poppet member 106 is adapted to form a substantially fluid-tight seal with the valve seat 107. The poppet member 106 is coupled to a movable armature 111. The movable armature 111 moves in response to a magnetic field produced by an electromagnetic coil 108 and a magnetic core 110. The electromagnetic coil 108 is wrapped around a bobbin 109. When an electrical current is provided to the coil 108, a magnetic flux is created. The magnetic core 110 is provided to redirect the magnetic flux through the movable armature 111, thereby pulling the movable armature 111 and thus, the poppet member 106 towards the magnetic core 110. A biasing member 112 may also be provided that biases the poppet member 106 in a direction opposite the magnetic force. In the absence of the magnetic flux, the biasing member 112 can move the poppet member 106 in a direction opposite the magnetic force. The general operation of solenoid-actuated poppet valves is known in the art and therefore, a more detailed discussion is omitted for brevity of the description.

Often times, the fluid at the inlet 102 of the valve 100 acts on the poppet member 106 and provides a biasing force on the poppet member 106. This biasing force increases as the pressure at the inlet 102 increases. In order to keep the poppet member 106 against the valve seat 107, the biasing member 112 must be stronger than the force of the fluid pressure, which acts across an area defined by $\pi*r^2$ as is generally known in the art. Therefore, assuming a circular cross-section, the biasing force acting on the poppet member 106 by the fluid pressure is determined as:

$$F_b = P*\pi*r^2 \qquad (1)$$

Where:
$F_b$ is the biasing force;
P is the fluid pressure; and
r is the radius of the poppet member.

As the fluid pressure increases, the strength of the biasing member 112 increases and a stronger electromagnetic force from the electromagnetic coil 108 is required. The biasing force from the fluid can be minimized by making the valve smaller; however, this also results in a restricted flow through the valve when the valve is opened. Conversely, in order to obtain a higher flow rate, the valve is often enlarged. However, this approach results in an increased biasing force from the fluid pressure and thus, requires a stronger valve actuating force to overcome the fluid pressure and actuate the valve. The stronger valve actuating force often results in increased power consumption required by the electromagnetic coil 108. Consequently, there is typically a tradeoff between allowable flow rate and the power consumption of the valve.

Although power consumption may not be critical in certain valve applications, such as the prior art solenoid actuated poppet valve 100, for battery powered valves, power consumption is typically a major concern. Therefore, battery powered valves often are relatively small and restrict the flow through the valve. The restriction is not always ideal and there are some situations where higher flow rates and/or faster actuation times may be desired.

Therefore, there is a need in the art for a motorized valve that can operate with increased fluid pressure and/or flow rate. The embodiments described below overcome this and other problems and an advance in the art is achieved. The embodiments described below provide a motorized sleeve valve. The motorized sleeve valve advantageously actuates a sleeve surrounding at least a portion of a valve body. Therefore, the pressure drop through the opened valve is minimal and therefore, the flow restriction is reduced. Consequently, the fluid pressure provides minimal force on the sleeve and thus, a much smaller motor can be used to actuate the valve without sacrificing the valve's flow rate capabilities.

SUMMARY OF THE INVENTION

A motorized sleeve valve is provided according to an embodiment. According to an embodiment, the motorized sleeve valve comprises a valve body defining a first fluid port and a second fluid port. The motorized sleeve valve can further include a valve sleeve surrounding at least a portion of the valve body and configured to move between a first position and at least a second position to selectively allow fluid to flow through the second fluid port. According to an embodiment, the motorized sleeve valve further comprises an electric motor configured to actuate the valve sleeve between the first position and the second position.

A method for forming a motorized sleeve valve is provided according to an embodiment. The motorized sleeve valve includes a valve body including a first fluid port and a second fluid port. According to an embodiment, the method comprises a step of surrounding at least a portion of the valve body with a valve sleeve such that the valve sleeve can move between a first position and at least a second position to selectively allow fluid to flow through the second fluid port. According to an embodiment, the method may further comprise a step of positioning an electric motor within an interior of the valve sleeve to actuate the valve sleeve between the first and second positions.

ASPECTS

According to an aspect, a motorized sleeve valve comprises:
a valve body defining a first fluid port and a second fluid port;
a valve sleeve surrounding at least a portion of the valve body and configured to move between a first position and at least a second position to selectively allow fluid to flow through the second fluid port; and
an electric motor configured to actuate the valve sleeve between the first position and the second position.

Preferably, the valve body comprises a first valve body end and a second valve body end separated by one or more support arms.

Preferably, the second fluid port is defined by the first valve body end and the second valve body end.

Preferably, the motorized sleeve valve further comprises a protrusion extending from the second valve body end towards the first valve body end to direct fluid between the first and second fluid ports.

Preferably, the electric motor comprises a threaded spindle threadedly engaging the valve sleeve.

Preferably, the motorized sleeve valve further comprises one or more sealing members, wherein at least one of the sealing members seals an area of the valve sleeve inside an inner radius ($r_i$) from fluid flowing through the motorized sleeve valve.

Preferably, the motorized sleeve valve further comprises one or more vents formed in the valve sleeve.

According to another aspect, a method for forming a motorized sleeve valve with a valve body including a first fluid port and a second fluid port comprises steps of:
surrounding at least a portion of the valve body with a valve sleeve such that the valve sleeve can move between a first position and at least a second position to selectively allow fluid to flow through the second fluid port; and
positioning an electric motor within an interior of the valve sleeve to actuate the valve sleeve between the first and second positions.

Preferably, the method further comprises a step of separating the valve body into a first valve body end and a second valve body end with one or more support arms.

Preferably, the method further comprises a step of defining the second fluid port between the first valve body end and the second valve body end.

Preferably, the method further comprises a step of extending a protrusion from the second valve body end that extends towards the first valve body end.

Preferably, the method further comprises a step of threadedly engaging the valve sleeve with a threaded spindle extending from the electric motor.

Preferably, the method further comprises a step of positioning one or more sealing members on the valve body such that at least one of the sealing members seals an area of the valve sleeve inside an inner radius from fluid flowing through the motorized sleeve valve.

Preferably, the method further comprises a step of forming one or more vents in the valve sleeve.

DETAILED DESCRIPTION OF THE INVENTION

FIGS. 2-5 and the following description depict specific examples to teach those skilled in the art how to make and use the best mode of embodiments of a sleeve valve. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the sleeve valve. As a result, the embodiments described below are not limited to the specific examples described below, but only by the claims and their equivalents.

Figure 2:
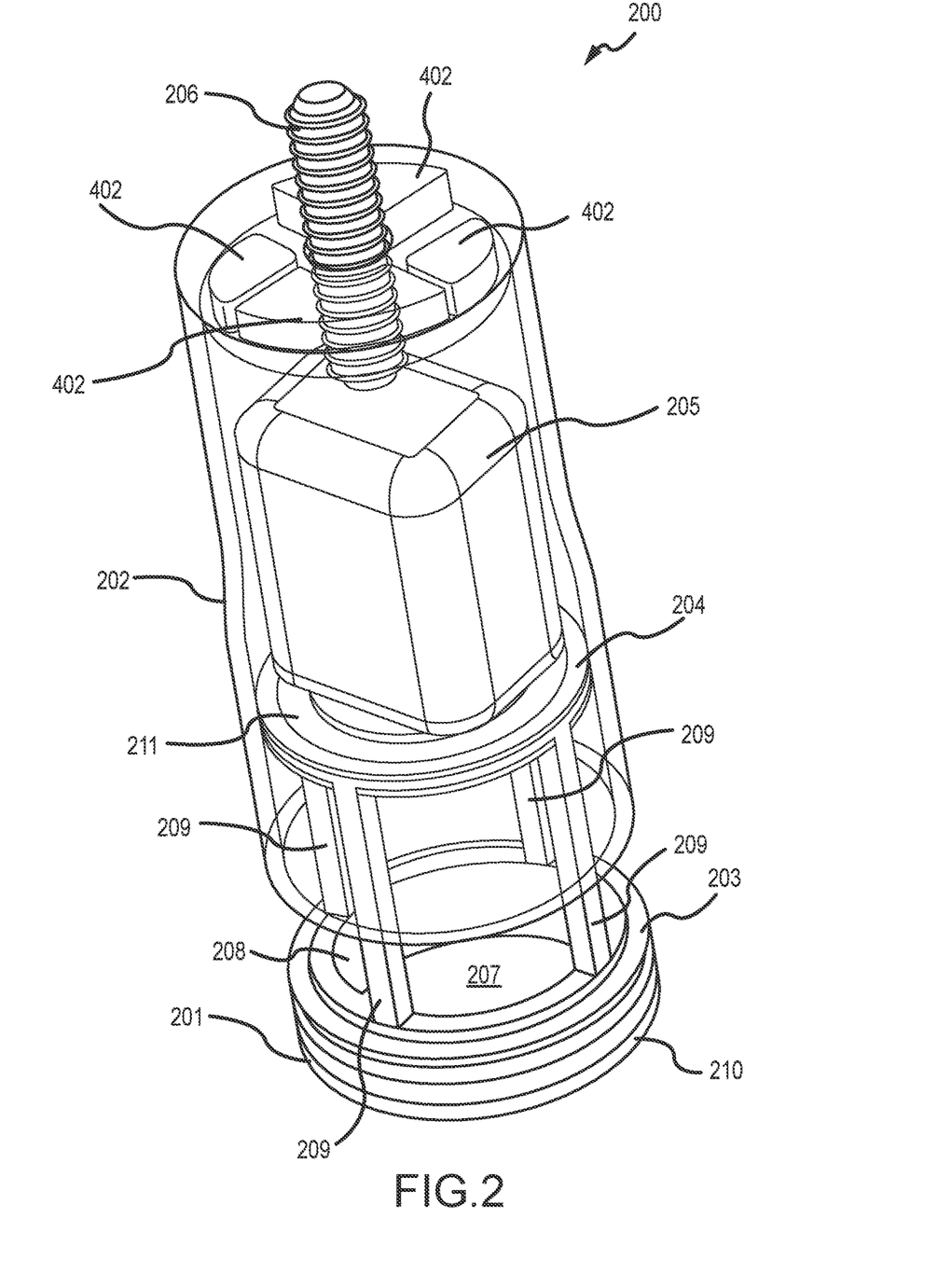
FIG. 2 shows a motorized sleeve valve according to an embodiment.

FIG. 2 shows a motorized sleeve valve 200 according to an embodiment. According to an embodiment, the motorized sleeve valve 200 comprises a valve body 201 and a valve sleeve 202 surrounding at least a portion of the valve body 201. Although the valve sleeve 202 is shown as being at least partially transparent, in other embodiments, the valve sleeve 202 may be at least partially opaque. The valve body 201 includes one or more sealing members 203, 204, which can form a fluid tight seal between the valve body 201 and the valve sleeve 202. The sealing members 203, 204 are shown as comprising 0-rings; however, other types of seals may be used.

According to an embodiment, the motorized sleeve valve 200 further comprises an actuator 205 in the form of an electric motor 205. The electric motor 205 may be positioned within the valve sleeve 202. According to an embodiment, the electric motor 205 may be coupled to the valve body 201 to prevent the electric motor 205 from moving. The electric motor 205 is designed to actuate the valve by moving the valve sleeve 202 relative to the valve body 201. According to the embodiment shown, the electric motor 205 can move the valve sleeve 202 via a threaded spindle 206 that is threadedly engaged with the valve sleeve 202 and rotates about its longitudinal axis upon actuation of the electric motor 205. The electric motor 205 may be reversible such that the threaded spindle 206 can rotate clockwise and counter clockwise. It should be appreciated that the threaded spindle can be replaced with other components such as a sliding armature that can be coupled to the valve sleeve 202 and move parallel with respect to the longitudinal axis Y-Y (See FIG. 3) of the valve 200, for example. Consequently, the claims that follow should in no way be limited to threaded spindles. In such a situation, the electric motor 205 may comprise an electric linear motor as is generally known.

According to an embodiment, the electric motor 205 can comprise a battery powered electric motor. However, in other embodiments, the electric motor 205 can receive power from an external source. As discussed in more detail below, because of the sleeve design of the valve, the electric motor 205 does not have to provide the high actuation force required by the solenoid of the prior art poppet valve 100. Rather, for a given fluid pressure, the valve sleeve 202 is acted upon by a much lower biasing force than the poppet member 106.

According to the embodiment shown in FIG. 2, the valve body 201 can comprise a first fluid port 207 and a second fluid port 208. The valve body 201 can include a plurality of support arms 209, which can space a first valve body end 210 from a second valve body end 211 to define at least a part of the second fluid port 208. The second fluid port 208 is shown positioned between the two valve body ends 210, 211. According to the embodiment shown, the second fluid port 208 extends in approximately 360 degrees radially around the valve body 201. In other embodiments, the second fluid port 208 may extend less than the full 360 degrees. Although much of the description refers to the first fluid port 207 comprising the inlet and the second fluid port 208 comprising the outlet, the flow can be reversed and the direction of the flow will depend on the particular implementation.

According to an embodiment, the first valve body end 210 may be coupled to a fluid supply, a pipeline, etc. that carries a fluid. In some embodiments, the entire sleeve valve 200 may be positioned within the device for which the fluid is provided. Alternatively, the sleeve valve 200 may be used as an exhaust wherein the second fluid port 208 is open to atmosphere. As can be appreciated, because the valve sleeve 202 covers the second port 208, the second port 208 is generally not able to make a fitting type connection with a tube or a pipe, for example. Those skilled in the art will readily recognize suitable fluid couplings for the sleeve valve 200, such as a tubular shroud 500 (See FIG. 5). The tubular shroud 500 is shown being coupled to the first valve body end 210; however other coupling configurations are certainly possible.

As mentioned above, prior art poppet valves are generally unsuitable for electric motor actuation because the pressurized fluid acts on a relatively large portion of the poppet member. Thus, higher actuation forces are required to overcome the biasing forces of the fluid pressure. For example, the electric motor 205 shown in the figures would generally be unsuitable to actuate the poppet valve 100 due to the high power consumption. The life of the electric motor 205 would be much less than the life of the remaining components of the valve 100. The motorized sleeve valve 200 however, overcomes these drawbacks and allows for lower powered electric motors to be utilized while maintaining a similar or higher flow rate and/or a similar or lower pressure drop. Because of the lower power required, the battery life can be improved and the use of a high powered solenoid is not necessary.

Figure 3:
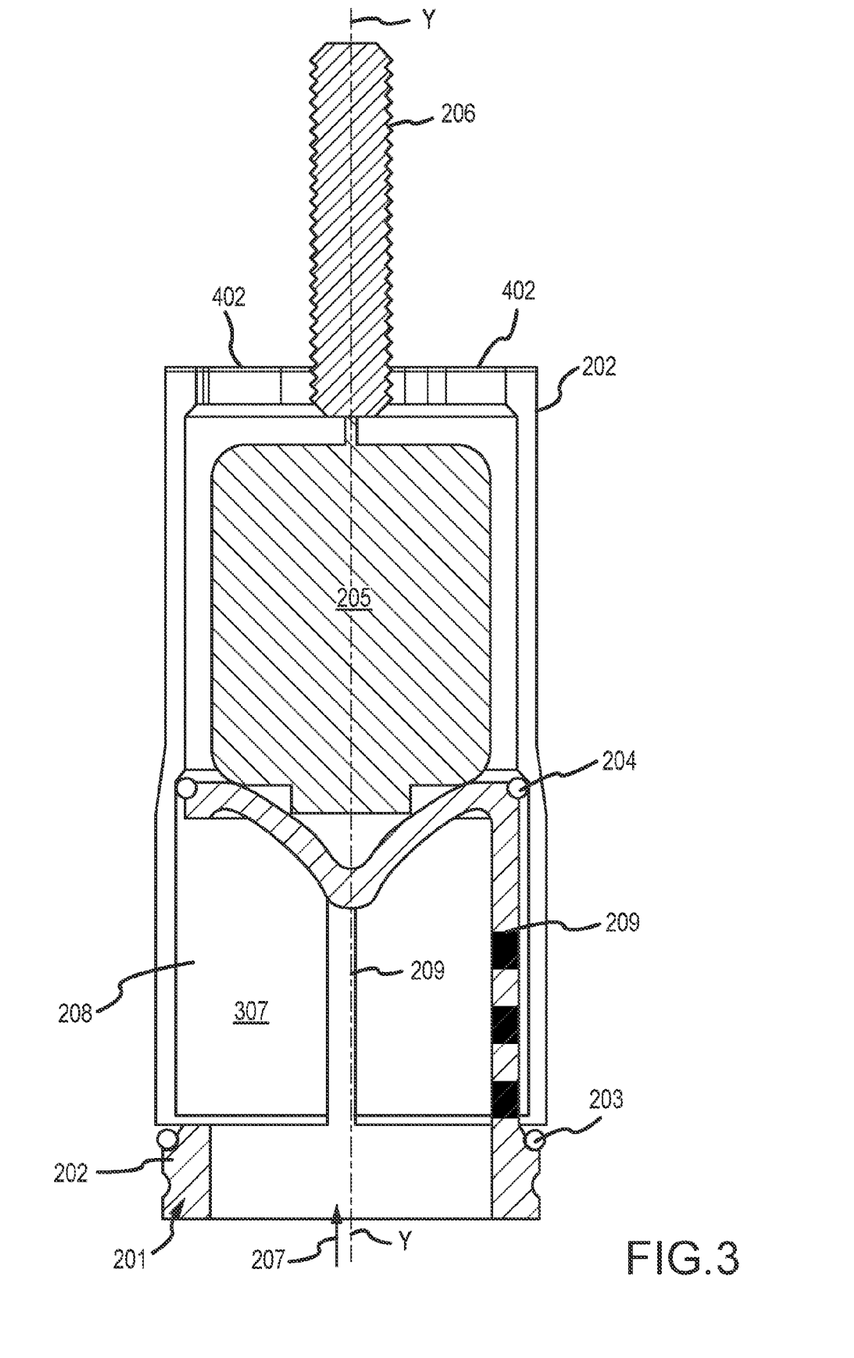
FIG. 3 shows a cross-sectional view of the motorized sleeve valve in a closed position according to an embodiment.

FIG. 3 shows a cross-sectional view of the motorized sleeve valve 200 according to an embodiment. In the embodiment shown in FIG. 3, the valve 200 is closed, i.e., fluid at the inlet 207 cannot flow through the outlet 208. Rather, fluid at the inlet 207 remains in a fluid chamber 307. As can be appreciated from FIG. 3, even with pressurized fluid at the inlet 207, the fluid provides very little biasing force on the valve sleeve 202 due to the sealing members 203, 204. Therefore, rather than the fluid pressure acting on the valve sleeve 202 in a direction parallel to the longitudinal axis Y-Y (and also parallel to the motion of the valve sleeve 202), the fluid pressure acts radially on the valve sleeve 202 and perpendicular to the longitudinal axis Y-Y. The biasing pressure of the fluid, thus, has very little impact on the required actuation force of the valve sleeve 202.

One advantage of the sleeve valve 200 is that because the valve sleeve 202 is actuated by the threaded spindle 206 and the electric motor 205, the valve sleeve 202 can be held in any desired position. This allows for various sized port apertures. Another advantage is that the valve sleeve 202 can be held in any position without continuously supplying power to the electric motor 205.

Figure 4:
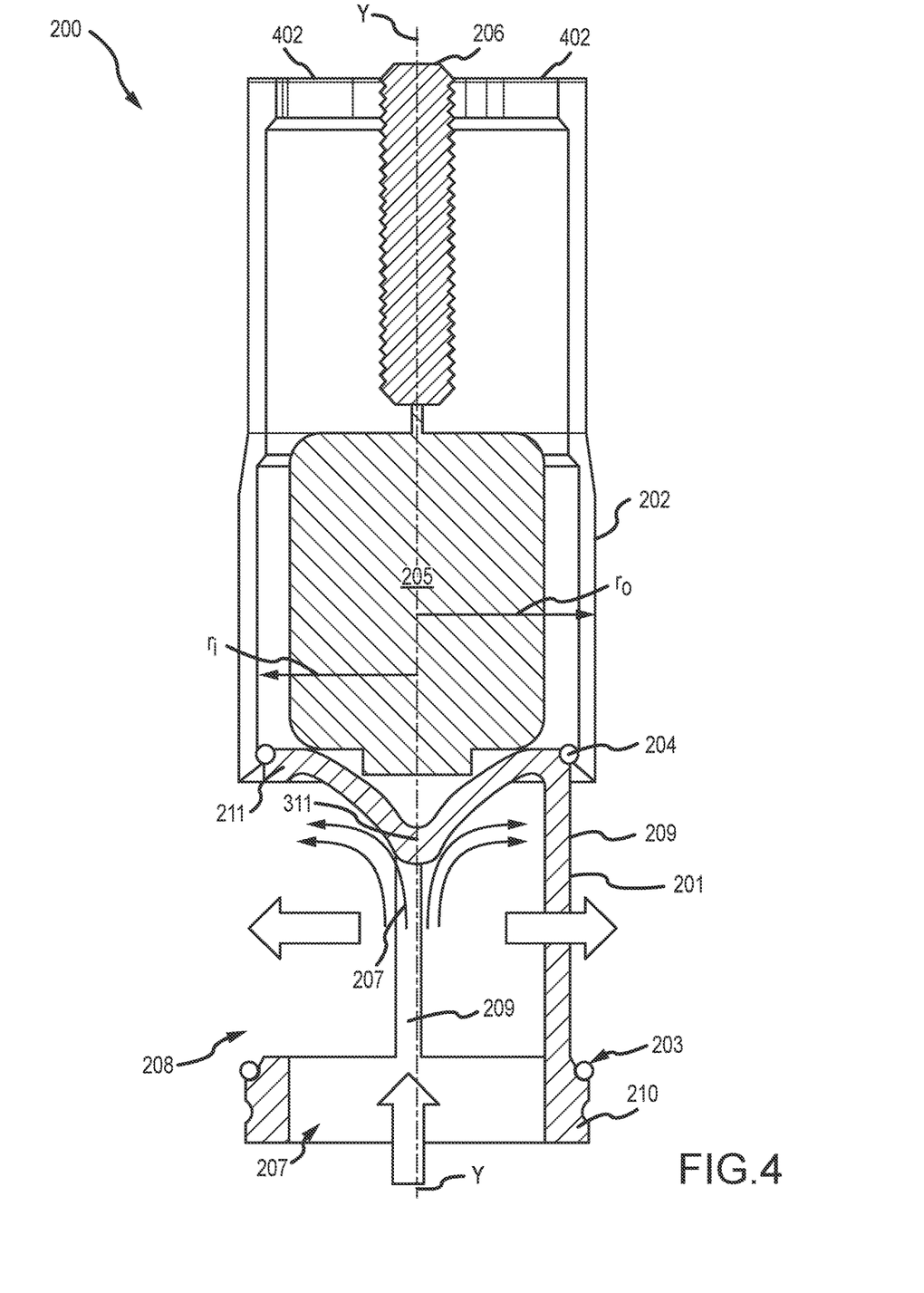
FIG. 4 shows a cross-sectional view of the motorized sleeve valve in an open position according to an embodiment.
Figure 5:
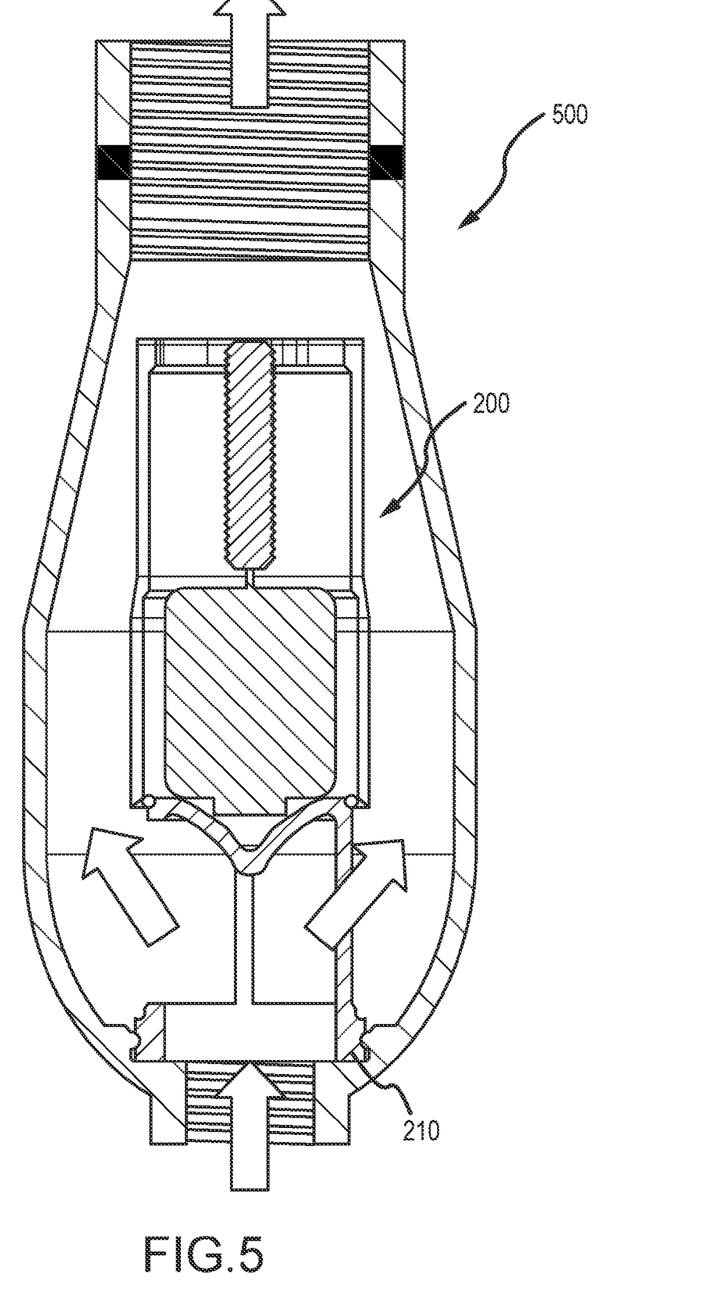
FIG. 5 shows a cross-sectional view of the motorized sleeve valve positioned in a tubular shroud according to an embodiment.

FIG. 4 shows a cross-sectional view of the motorized sleeve valve 200 according to another embodiment. In the embodiment shown in FIG. 4, the valve sleeve 202 has been actuated from the first position shown in FIG. 3 to a second position with respect to the valve body 201. In the second position, the valve sleeve 202 has opened to allow fluid to flow through the outlet 208. According to an embodiment, the valve sleeve 202 may have been actuated using the electric motor 205 and the threaded spindle 206, for example. As can be appreciated, once the electric motor 205 actuates the valve sleeve 202 to the desired position, the valve sleeve 202 can remain in that position without requiring further energy from the electric motor 205. This is one main advantage of using the electric motor 205 and a threaded spindle 206. As can be appreciated, such a configuration requires much less power than the solenoid of the poppet valve 100 that requires a continuous supply of power to keep the valve open and must counter the biasing force of a spring.

With the valve sleeve 202 in the second position, fluid is free to flow from the inlet 207 through the outlet 208 as shown by the arrows (or the flow could be reversed). According to an embodiment, the valve body 201 can comprise a protrusion 311, which extends from the second end 211 towards the first end 210. The protrusion 311 can be provided to direct fluid towards the outlet 208. Therefore, rather than the fluid entering the inlet 207 and flowing into a flat surface as shown by the poppet member 106 of FIG. 1 and losing energy in the form of turbulence and pressure losses, the protrusion 311 can reduce turbulence by directing the flow of fluid from one port to another. According to an embodiment, the protrusion 311 can help direct the fluid in both directions. In other words, while the protrusion 311 can direct fluid from the inlet 207 towards the outlet 208, in embodiments where the flow is reversed, the protrusion 311 is optimally shaped to direct fluid from the outlet 208 towards the inlet 207 as well. Consequently, the direction of the flow of the fluid through the motorized sleeve valve 200 should not be limited.

According to an embodiment, the valve sleeve 202 can further comprise one or more vents 402. The vents 402 can prevent a vacuum from forming as the valve sleeve 202 moves with respect to the valve body 201. Without the vents 402, a vacuum would likely form due to the sealing member 204 and thus, actuation of the valve sleeve 202 would require a greater actuation force. Therefore, the vents 402 can reduce the actuation force required by preventing a vacuum from forming and reducing the weight of the valve sleeve 202.

As can be appreciated by FIG. 4, actuation of the valve sleeve 202 back to the first position requires much less actuation force than the poppet member 106 of the prior art poppet valve. This can be realized upon a simple surface area calculation, which assumes a circular cross-section. It should be appreciated that the valve 200 may comprise other cross-sectional shapes and the circular cross-section is merely used as an example. The fluid pressure at the inlet 102 of the poppet valve acts on the entire cross-sectional surface area of the poppet member 106, which is shown above is defined by $\pi * r^2$. For purposes of easy illustration, assume that the outer radius $r_o$ of the sleeve valve 200 is equivalent to the radius r of the poppet member 106. However, because of the sealing member 204, the fluid pressure does not act on the entire cross-sectional area of the valve sleeve 202. Rather, the fluid pressure only acts on the area defined by $\pi * r_o^2 - \pi * r_i^2$, where $r_o$ is the outer radius and $r_i$ is the inner radius of the valve sleeve 202. Thus, for a given fluid pressure, the biasing force provided on the valve sleeve 202 is provided by equation (2).

$$F_b = P(\pi * r_o^2 - \pi * r_i^2) \quad (2)$$

Where:
$r_o$ is the outer radius of the valve sleeve 202; and
$r_i$ is the inner radius of the valve sleeve 202.

Consequently, much less biasing force is provided by the fluid for the sleeve valve 200 compared to the poppet valve 100. Because the sealing member 204 limits the area of the valve sleeve 202 that is in fluid communication with the fluid, a much lower actuation force is required to actuate the valve sleeve 202. Consequently, a smaller electric motor 205 can be provided while adequately actuating the valve 200. Further, for a given sized electric motor 205, a larger flow area can be provided to reduce the pressure drop through the valve and provide increased flow rate. It should be appreciated that while the sealing member 204 is designed to provide a fluid-tight seal between the valve body 201 and the valve sleeve 202, even if small amounts of fluid leak past the sealing member 204, the fluid can exhaust out the vents 402. Consequently, a pressure buildup in the valve sleeve 202 will not occur and the required force of the electric motor 205 does not have to increase.

The embodiments described above provide a motorized sleeve valve 200 that does not require high actuation forces that increase dramatically with increasing fluid pressure. The embodiments advantageously utilize a valve sleeve 202 that covers one of the fluid ports 208 to close the valve 200. Whereupon closing the fluid port 208, the fluid pressure at the inlet port 207 only acts radially on the valve sleeve 202. Therefore, a continuous closing force is not required.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other sleeve valves, and not just to the embodiments described above and shown in the accompanying figures. Accordingly, the scope of the embodiments described above should be determined from the following claims.

I claim:

1. A motorized sleeve valve (200), comprising:
    a valve body (201) defining a first fluid port (207) and a second fluid port (208);
    a valve sleeve (202) surrounding at least a portion of the valve body (201) and configured to move between a first position and at least a second position to selectively allow fluid to flow through the second fluid port (208);
    an electric motor (205) positioned within the valve sleeve and configured to actuate the valve sleeve (202) between the first position and the second position; and
    one or more sealing members (203, 204), wherein at least one of the sealing members (204) seals an area of the valve sleeve (202) inside an inner radius ($r_i$), from fluid flowing through the motorized sleeve valve (200), whereby fluid pressure acts radially on the valve sleeve (202) and perpendicular to a longitudinal axis of the valve sleeve (202);
    wherein the electric motor (205) comprises a threaded spindle (206) threadedly engaging the valve sleeve (202).

2. The motorized sleeve valve (200) of claim 1, further comprising one or more vents (402) formed in the valve sleeve (202).

3. The motorized sleeve valve (200) of claim 1, wherein the valve body (201) comprises a first valve body end (210) and a second valve body end (211) separated by one or more support arms (209).

4. The motorized sleeve valve (200) of claim 3, wherein the second fluid port (208) is defined by the first valve body end (210) and the second valve body end (211).

5. The motorized sleeve valve (200) of claim 3, further comprising a protrusion (311) extending from the second valve body end (211) towards the first valve body end (210) to direct fluid between the first and second fluid ports (207, 208).

6. A method for forming a motorized sleeve valve with a valve body including a first fluid port and a second fluid port, comprising steps of:
    surrounding at least a portion of the valve body with a valve sleeve such that the valve sleeve can move between a first position and at least a second position to selectively allow fluid to flow through the second fluid port;
    positioning an electric motor within an interior of the valve sleeve to actuate the valve sleeve between the first and second positions;
    positioning one or more sealing members on the valve body such that at least one of the sealing members seals an area of the valve sleeve inside an inner radius from fluid flowing through the motorized sleeve valve and limits the area of the valve sleeve (200) that is in fluid communication with the fluid, whereby fluid pressure acts radially on the valve sleeve (202) and perpendicular to a longitudinal axis of the valve sleeve (202); and
    threadedly engaging the valve sleeve with a threaded spindle extending from the electric motor.

7. The method of claim 6, further comprising a step of forming one or more vents in the valve sleeve.

8. The method of claim 6, further comprising a step of separating the valve body into a first valve body end and a second valve body end with one or more support arms.

9. The method of claim 8, further comprising a step of defining the second fluid port between the first valve body end and the second valve body end.

10. The method of claim 8, further comprising a step of extending a protrusion from the second valve body end that extends towards the first valve body end.

* * * * *